United States Patent Office 2,896,960
Patented July 28, 1959

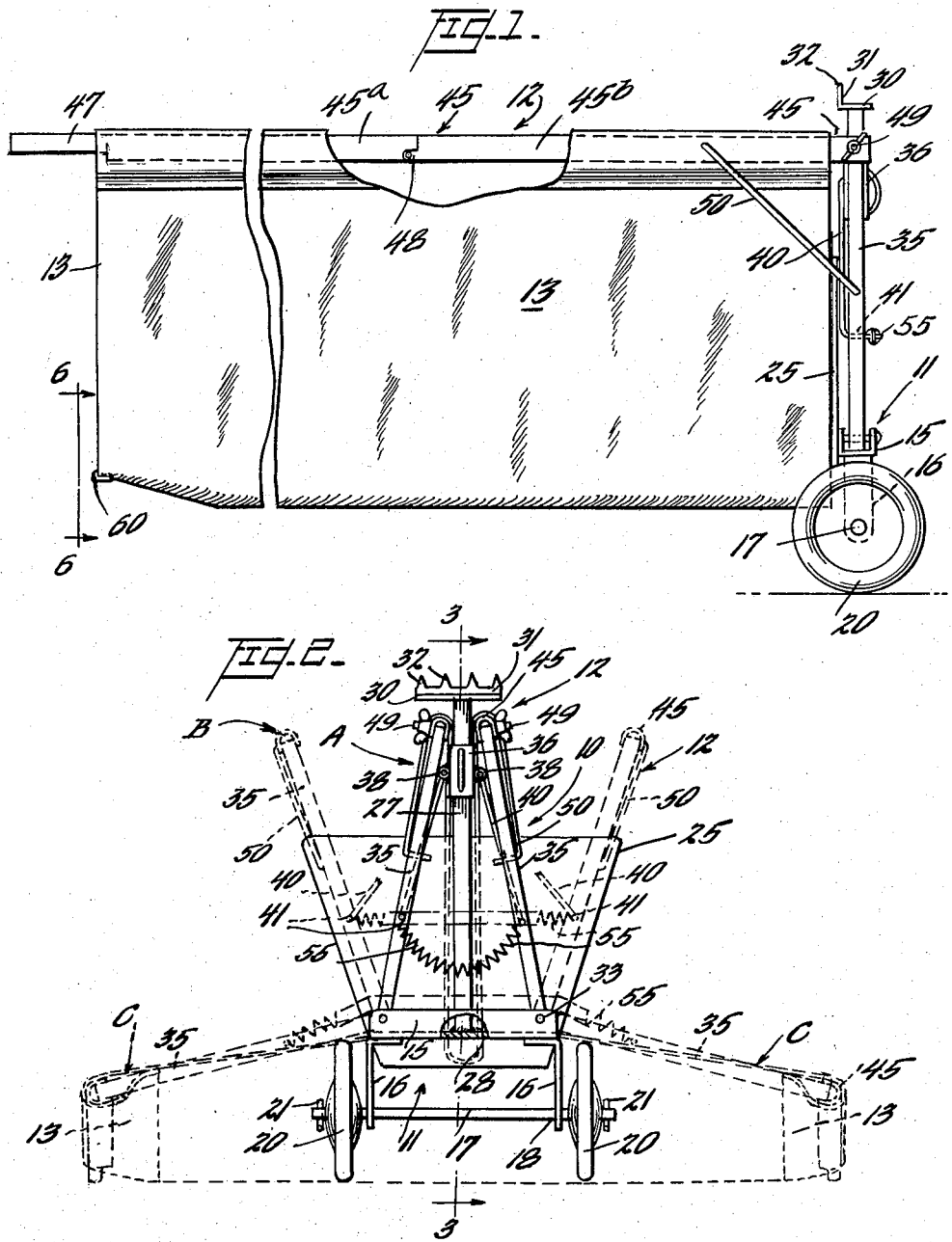

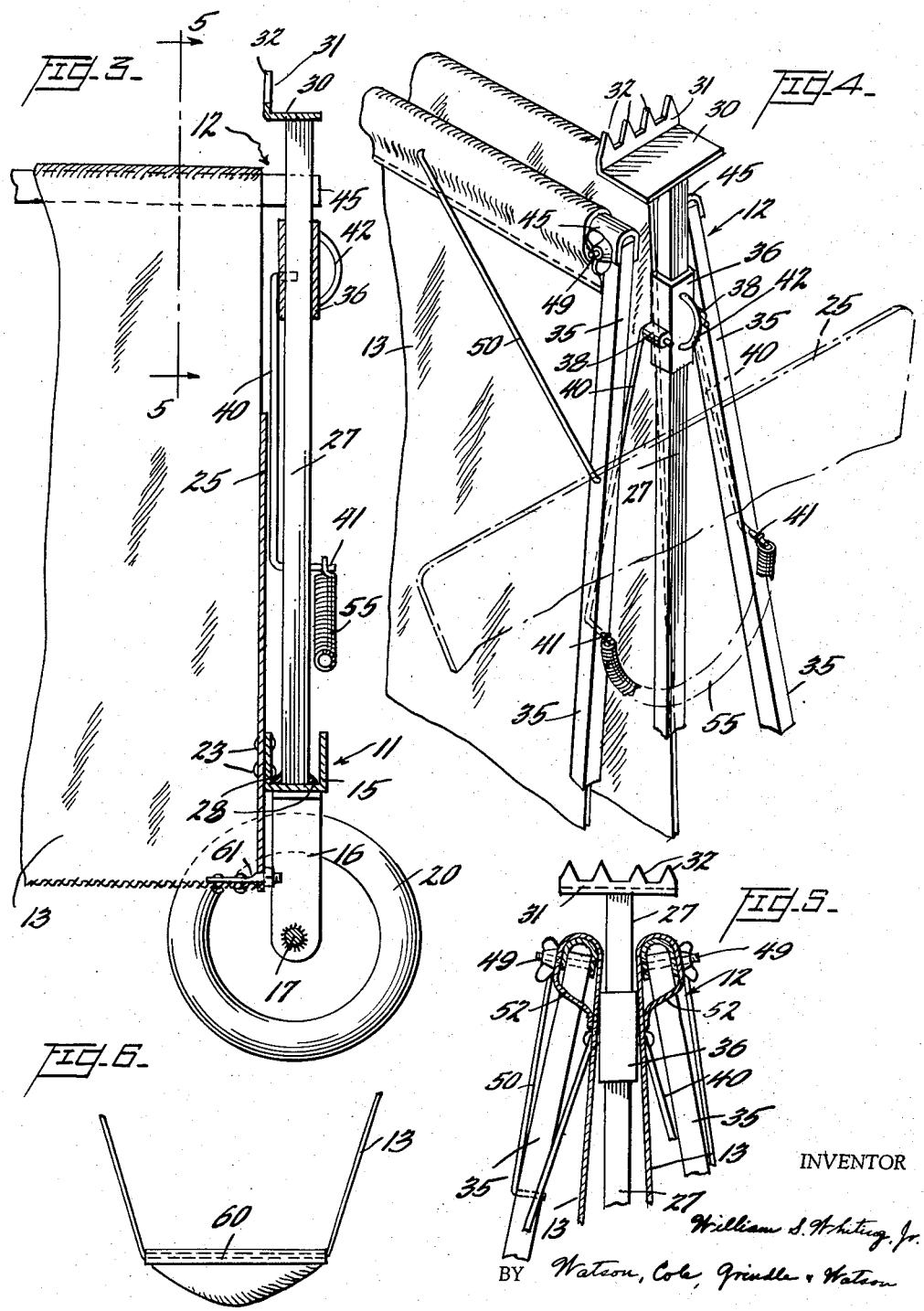

2,896,960

HAND BARROWS

William S. Whiting, Jr., Camden, S.C.

Application February 10, 1958, Serial No. 714,339

8 Claims. (Cl. 280—36)

This invention relates to portable receptacles and more particularly to hand carts or barrows for the gathering and transport of miscellaneous articles or materials.

The general object of the invention is the provision of a novel and improved portable receptacle which is particularly adapted for use in gardening and lawn care, and which for these purposes is easily collapsible from a transport condition to a position wherein the receptacle is spread out adjacent the ground or floor surface for easy loading, and thereafter just as readily raised to the position wherein the load is concentrated and at least partially enveloped, and may be carried off to its destination with minimum danger of loss or spillage.

A further object of the invention is to provide a knock-down barrow of the class described which may be readily dismantled as for shipment or for storage when not in regular use.

The invention, in its preferred embodiment, contemplates the provision of an expansible portable receptacle comprising a relatively extensive sheet of flexible fabric, whether of cloth or metal, forming the main body of the receptacle; a pair of handled side bars to which opposite margins of the sheet are secured; and a small wheeled truck upon which the forward ends of said side bars are supported.

In use, the side bars may be spread apart and lowered practically to the ground surface whereupon the sheet is spread out full width; and the load, whether lawn clippings, fallen leaves, or other articles or materials, may be piled thereon. When the capacity of the receptacle is reached, the side bars are raised and brought together centrally of the device and the sheet will be suspended with its enclosed load in an approximately U-shaped configuration.

The rearwardly projecting handle portions of the side bars are grasped during this latter operation and during the propelling of the wheeled cart to the point of discharge of the load.

Other objects and features of novelty, including the provision of certain accessories and constructional details for enhancing the utility of the device in lawn work and the like, will be understood from the following specification when read in connection with the accompanying drawings in which one embodiment of the invention is illustrated by way of example.

In the drawings:

Figure 1 is a view in side elevation of a cart or barrow embodying the principles of the invention;

Figure 2 is a view in front elevation of the same device, with lowered and intermediate positions of the receptacle shown in broken lines;

Figure 3 is a fragmentary view in longitudinal vertical section of the forward portion of the barrow;

Figure 4 is a view in perspective of the same forward portion;

Figure 5 is a detail sectional view of the upper end of the forward portion as taken on line 5—5 of Figure 3; and Figure 6 is a fragmentary detail view in rear elevation of the lower rear portion of the receptacle.

The novel cart or barrow which has been selected for exemplary illustration in the drawings of the present application is designated generally by the reference numeral 10 and will be seen to comprise the forwardly disposed truck assembly 11 and the rearwardly extending side frames 12 from which the fabric sheet receptacle 13 is suspended.

As best shown in Figures 1, 2 and 3 of the drawings, the truck comprises a transversely extending channel member 15 having downwardly extending inverted L-brackets 16 secured thereto as by welding. An axle 17 may be passed through openings in the downwardly extending flanges of the brackets 16 and the axle may be welded to the bracket as at 18. Suitable ground wheels 20 are rotatably mounted on the projecting ends of the axle and retained thereon by means of the cotters 21. Secured to the rear vertical flange of the channel member 15, as by means of the rivets 23, is the vertical front plate 25 in the nature of a dashboard, the specific purpose of which will be described presently.

A vertical guide post 27 preferably of square section is fixed centrally of the channel 15 as by means of welding at 28. Fixed to the upper end of this guide post 27 is an angle plate 30, the vertical flange 31 of which is serrated or toothed as at 32 to provide an accessory for cleaning material from the teeth of lawn rakes, the tines of a pitch fork, or the like.

Pivotally secured to the vertical flanges of the channel member 15, as at 33, are the struts 35. A squared sleeve or rider 36 surrounds the guide post 27 and is provided laterally with the eyes 38 through which angled portions of the links 40 extend, the lower angled portions of the links 40 projecting through openings 41 in a lower intermediate portion of the respective struts 35. The sleeve 36 has a lifting bail 42.

The struts 35 comprise in effect portions of the side frame assemblies 12 and the principal part of each of these side frame members is constituted by the jointed side bars 45 comprising a rear section 45a having handle portions 47 and the forward part 45b, the two parts being connected as by means of the rule joint 48.

The side bars 45 are of inverted U-shaped section and they embrace at their forward ends the upper ends of the struts 35, as clearly shown in Figure 4 of the drawings. For pivotally connecting the forward ends of the side bars 45 and the upper ends of the struts 35, bolt and wing-nut connecting elements 49 are employed. The side bars and the struts may be connected for maintaining their normal right angle relationship, as by means of the links or brace elements 50.

The side bars 45 pass through loops or hems 52 formed in the edges of the fabric sheet receptacle 13 and the sheet depends from the side bars 45 in a generally U-shaped configuration during idle and transporting conditions. The sheet may be of textile fabric, plastic, wire link mesh, or any other suitable flexible sheet material.

A coil tension spring 55 connects the two points 41 at the lower intermediate portions of the struts 35, as for example, by being secured to the projecting ends of the lower angled portions of the links 40. The length of the spring is preferably such that it is in relatively relaxed position without either buckling or stretching when the parts are in the transport position indicated at B in Figure 2. However, when the side bars 45 are brought together as in position A the spring 55 buckles and droops as clearly shown in that figure of the drawings.

Now when the side bars are lowered to the position indicated at C in Figure 2, as for loading the receptacle 13, the struts 35 pass downwardly beyond a horizontal position, in which they are aligned with the channel member 15 transversely of the device, to a position beyond such aligned "dead-center" position, and the spring 55 is stretched and bent to the configuration suggested in the lower broken line position of Figure 2 where the intermediate portion of the spring is retained by and rests upon a part of the truck such as the angle member 15 while the end portions of the spring are directed downwardly and outwardly.

In this loading position the fabric sheet 13 is spread substantially upon the ground and leaves, lawn clippings, or other material may readily be placed upon it. When the capacity of the receptacle is reached the side bars 45, by the manipulation of the handles 47, are brought upwardly to the transport position B, whereby the load is embraced and enveloped by the fabric sheet and is ready for transport to its destination. The front dashboard member 25 prevents the material from falling out of the receptacle forwardly, and the lower intermediate portion of the rear edge of the sheet is clamped by means of the stiffening element 60 which may be a piece of undeformable metal of U-shaped section. This arrangement provides a sort of lip for the rear end of the receptacle, as clearly shown in Figure 6 of the drawings, and which is effective in preventing or minimizing spillage of the contents of the receptacle rearwardly. The forward lower edge of the sheet 13 may be secured to the bottom edge of the dashboard 25 as by means of the clamping devices 61.

It will be readily seen that there are three principal positions of the parts of the device, namely, the storage position A in which the side bars are closest together; a transport position B in which the side bars are spaced somewhat apart and the fabric receptacle 13 is opened up somewhat to support the load; and the lowermost loading position C in which the fabric sheet receptacle 13 is virtually spread upon the ground.

Furthermore, the pivoted and interlinked parts may be readily dismantled or disassembled for packing and shipment within a very small compass, due to the quick detachable means at the pivotal points and the rule joints 48 in the side bars which permit them to be doubled upon themselves.

Various changes and modifications may be made in the embodiment illustrated and described herein without departing from the scope of the invention as defined by the following claims.

Having thus described the invention, what is claimed as new and desired to be secured by Letters Patent is:

1. A hand barrow affording an expansible and collapsible portable receptacle and comprising, in combination, a wheeled truck located at one end of the barrow, a pair of substantially parallel side bars extending from said truck and terminating in handle portions at their ends remote from said truck, means for operatively connecting the other ends of the side bars to the truck for supporting them, a fabric sheet secured along opposite side edges to the respective side bars; and means for adjusting said side bar supporting means relatively to the truck to lower and raise the side bars and at the same time respectively spread the side bars apart and move them together, whereby when in one raised position the bars are relatively close to each other and the sheet is supported in a substantially U-shaped condition as for transport, and when in lowered position the bars are quite far apart and close to ground level and the fabric sheet is spread full width adjacent the ground as for loading.

2. The barrow as set forth in claim 1, in which the truck is provided with a dashboard for retaining the load within the adjacent end of the U-shaped suspended sheet, and in which the lower portion of the catenary configuration of the suspended remote edge of the fabric sheet is reinforced with stiffening material to aid in retaining the load on the sheet at the end of the barrow remote from the truck.

3. The barrow as set forth in claim 1 in which said supporting means comprises a pair of laterally spaced struts pivoted at their lower ends to said truck for lateral spreading movement in a transverse plane, and having their upper ends fixed to the ends of said side bars.

4. The barrow as set forth in claim 3 in which guiding means are provided on said truck for insuring uniform spreading movement of the two struts and permitting adjustment of the struts, side bars, and fabric sheet receptacle in an uppermost idle folded position as well as the said transport and loading positions, and where in said lowermost position the struts diverge in substantially opposite directions and occupy positions close to the ground surface, and the fabric and side bars are in maximum proximity with the ground.

5. The barrow as set forth in claim 3 wherein a centrally disposed guide post projects upwardly from the truck, a sleeve is mounted on said post for vertical sliding movement thereon, and a pair of links have their ends connected respectively to said sleeve and said struts.

6. The barrow as set forth in claim 5 in which a resilient extensible element connects corresponding portions of said struts to normally urge the latter to an approximately upright position.

7. The barrow as set forth in claim 5 in which an extensible spring connects corresponding intermediate portions of said struts to normally urge the latter to a substantially upright intermediate position as for transport, said spring adapted to buckle and droop when the struts are moved to extreme upright position, and to stretch when the struts assume their lowermost spread positions.

8. The barrow as set forth in claim 7 in which, when the struts are in their lowermost positions, they have passed beyond straight line or 180° position with relation to each other, and thus the spring serves to retain the struts, the bars, and the fabric sheet in lowermost loading position after the struts have passed the 180° dead-center position described.

References Cited in the file of this patent

UNITED STATES PATENTS

| 958,347 | Younglove | May 17, 1910 |
| 1,396,420 | Glinchikoff | Nov. 8, 1921 |
| 1,554,034 | Richie | Sept. 15, 1925 |
| 2,463,164 | Exter | Mar. 1, 1949 |
| 2,606,771 | Rehnberg | Aug. 12, 1952 |

FOREIGN PATENTS

| 5,806 | Great Britain | of A.D. 1909 |